US007647266B1

(12) United States Patent
Triplett

(10) Patent No.: US 7,647,266 B1
(45) Date of Patent: Jan. 12, 2010

(54) SYSTEM AND METHOD FOR HOLDING AND SENDING AN ORDER TO A MATCHING ENGINE

(75) Inventor: Mark W. Triplett, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 911 days.

(21) Appl. No.: 10/807,762

(22) Filed: Mar. 24, 2004

(51) Int. Cl.
*G06Q 40/00* (2006.01)
(52) U.S. Cl. ........................................ 705/37
(58) Field of Classification Search ................ 705/37
See application file for complete search history.

(56) References Cited

U.S. PATENT DOCUMENTS

| 4,674,044 | A | * | 6/1987 | Kalmus et al. ................. 705/37 |
| 5,787,402 | A | * | 7/1998 | Potter et al. .................... 705/37 |
| 6,532,460 | B1 | * | 3/2003 | Amanat et al. ............. 705/36 R |
| 6,938,011 | B1 | * | 8/2005 | Kemp et al. .................... 705/37 |

2002/0052827 A1 * 5/2002 Waelbroeck et al. .......... 705/37

OTHER PUBLICATIONS

Co-pending U.S. Appl. No. 11/416,398, filed May 2, 2006.
Co-Pending U.S. Appl. No. 10/807,762, filed Mar. 24, 2004.

* cited by examiner

*Primary Examiner*—James A Kramer
*Assistant Examiner*—James A Vezeris
(74) *Attorney, Agent, or Firm*—McDonnell Boehnen Hulbert & Berghoff LLP

(57) ABSTRACT

A user can submit an order to buy or sell a tradeable object, only the order does not get sent to the matching engine. Instead, the order is placed in temporary storage and it is displayed to the user in the form of a virtual order icon. The virtual order icon indicates that an order request is waiting for an event to occur before it is automatically released to the matching engine. The virtual order icon can be managed by the user, which might include moving the virtual order icon to a different price level or deleting it. The preferred system continuously monitors for an event to take place, and in response to detecting the event, the order is released to the matching engine. As such, a real order icon is displayed to indicate that the order has now been sent to the matching engine.

22 Claims, 6 Drawing Sheets

SYSTEM AND METHOD FOR HOLDING AND SENDING AN ORDER TO A MATCHING ENGINE

FIELD OF INVENTION

The present invention relates to electronic trading. More specifically, the present invention relates to displaying market information on a screen.

BACKGROUND

An electronic exchange provides an automatic matching process between buyers and sellers, also referred to herein as traders. In particular, traders connect to an electronic exchange over a communication link. If necessary, a gateway is sometimes used to connect the trader with the electronic exchange. Once a trader is connected, the electronic exchange can broadcast its data feed to the traders over the communication link. Subsequently, the traders receive the data feed, in one form or another, and their computers process the information. Traders may respond by sending orders to buy or sell the tradeable object. When the electronic exchange receives an order, it may check the limits of the order, for example price and quantity, and prioritize the order in its electronic order book. When buy and sell orders match, a trade occurs and information relating to the trade is relayed back to the traders' computers.

As used herein, a tradeable object simply refers to anything that can be traded with a price and/or quantity. Examples of tradeable objects may include, but are not limited to, all types of traded events, goods and/or financial products, such as, for example, stocks, options, bonds, futures, currency, and warrants, as well as funds, derivatives and collections of the foregoing. Moreover, tradeable objects may include all types of commodities, such as grains, energy, and metals. A tradeable object may be "real", such as products that are listed by an exchange for trading, or "synthetic", such as a combination of real products that is created by the trader. A tradeable object could actually be a combination of other tradeable objects, such as a class of tradeable objects.

For each tradeable object, an electronic exchange maintains an order book. The order book is generally a listing of unexecuted orders at various prices. As indicated earlier, when an order arrives at the electronic exchange, it determines if a match already exists in the order book. If so, then a match occurs such that part of the incoming order or the entire incoming order is filled. If not, then the incoming order is added to the order book. Orders are generally prioritized in the order book by at least the order price. A given price level might have one or more orders resting in the order book.

Information that describes some or all of the electronic exchange's order book is disseminated in the data feed to all of the traders. The kinds of information that are present in an electronic exchange's data feed are relatively dependent on the exchange itself. However, most electronic exchanges provide the same key pieces of information. For instance, they typically provide the best prices. This might include the best bid price, which represents the highest price that someone is willing to pay for the tradeable object, and the best offer price, which represents the lowest price that someone is willing to sell the tradeable object. Together, the best bid price and the best offer price available in the market make up the inside market. A data feed might also include one or more levels of the next best prices such as the next highest bid price(s) or the next lowest ask price(s). Along with price information, an electronic exchange will likely provide the bid and offer quantities available at those prices. More advanced electronic exchanges may even provide things like the last traded price ("LTP"), the last traded quantity ("LTQ"), the previous day's settlement price, the open price, the close price and other information.

During a typical trading day, traders send in orders to the electronic exchange with hopes that the market will reach their order prices and ultimately fill their orders. When a market moves up or down, a matching engine can sometimes match all of the orders resting in the order book at a particular price and then move to orders resting at the next price level, and sometimes this kind of market movement all happens with little or no hesitation. These "waves" of market movements can create instant buying and selling opportunities for the traders. Other times, the market moves up or down in a slower fashion. Either way, traders attempt to determine the market's direction and make trading decisions accordingly with hopes to profit on their assumptions.

In the following detailed description, tools for assisting a trader in capturing opportunities for a tradeable object are described. These tools provide advantages, as described below, to a trader in an electronic trading environment.

BRIEF DESCRIPTION OF THE DRAWINGS

Many aspects of the preferred embodiments may be better understood with reference to the following drawings. The components in the drawings are not necessarily to scale, emphasis instead being placed upon illustrating example embodiments.

DETAILED DESCRIPTION

I. Overview

The preferred embodiments are appropriate for use in an electronic trading setting, and particularly with an electronic exchange that automatically matches buy and sell orders. As described with reference to the accompanying figures, the preferred embodiments are provided to, among other things, facilitate fast and responsive order entry.

In one aspect of the preferred embodiments, a user can submit an order request through a trading application, only the order request is not actually sent to be matched at the exchange. Instead, the order request is placed in a temporary holding place. A temporarily held order is referred to herein as a "virtual order," because at this point the order request has not been released to the exchange's matching engine.

In another aspect of the preferred embodiments, when a predetermined event is detected, the virtual order is thereafter released and sent to the exchange's matching engine. After the event, the order request now becomes a real order to buy or sell the tradeable object, and if the order is not matched, it preferably is logged in the exchange's order book. One of ordinary skill in the art will appreciate that the predetermined event may include any action or occurrence. For purposes of illustration, examples of various events are provided to the reader herein.

In yet another aspect of the preferred embodiments, the virtual order is displayed on a trading screen. The preferred embodiments are appropriate for use with any electronic trading screen, however they work particularly well with a trading screen that displays market data in association with a price scale or axis. A trading screen with a price scale or axis is described in U.S. patent application Ser. No. 09/590,692, filed on Jun. 9, 2000, and entitled, "Click Based Trading With Intuitive Grid Display of Market Depth," the contents of which are incorporated herein by reference. According to this aspect, virtual orders may be displayed in association with a value scale so that one or more virtual orders can be quickly and conveniently managed and viewed by the user.

Other systems, methods, features, and advantages of the present invention will be or become apparent to one with skill in the art upon examination of the following drawings and description. It is intended that all such additional systems, methods, features, and advantages be within the scope of the present invention, and be protected by the accompanying claims.

II. Example Trading System

The system and method of the preferred embodiments are appropriate for use in any electronic trading environment. The example electronic trading system, comprising various elements, is described with the understanding that there are numerous equivalent elements and systems, all of which will be apparent to one of ordinary skill in the art.

Figure 1:
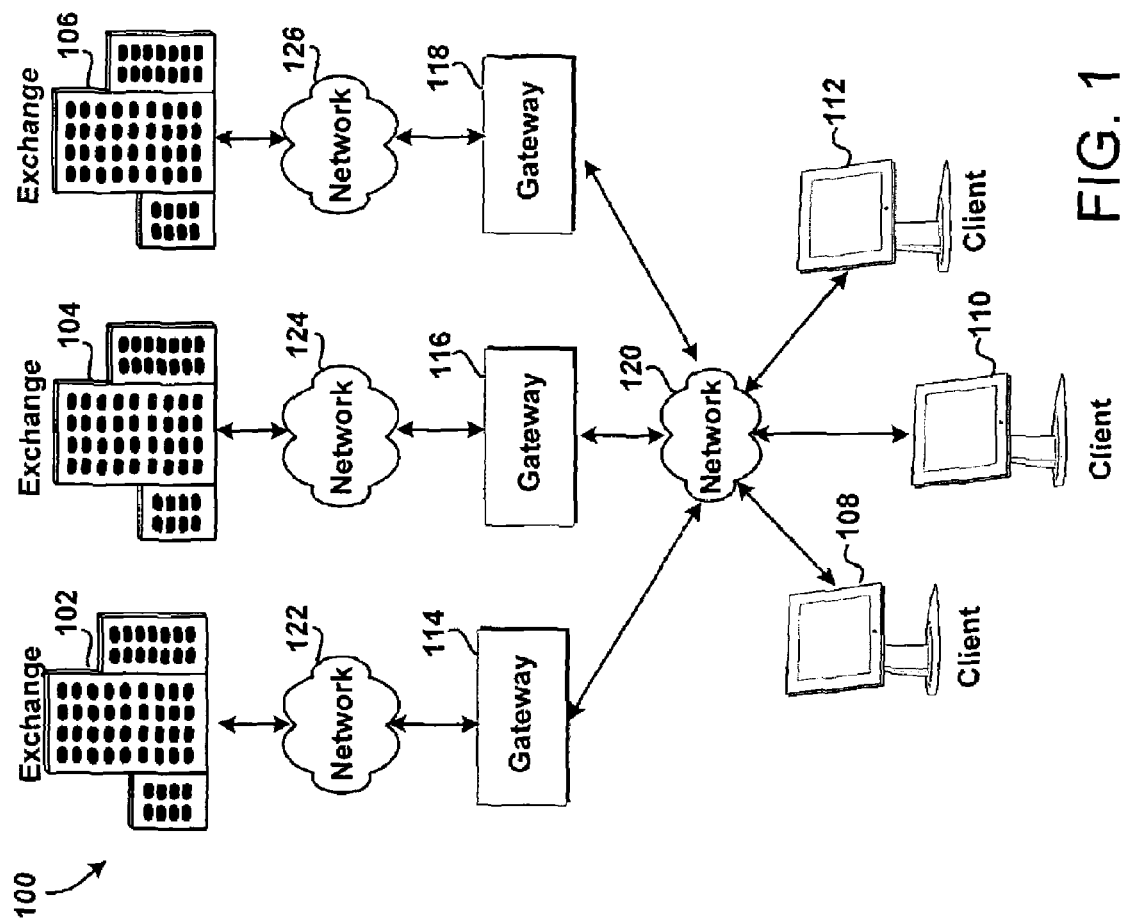
FIG. 1 illustrates an overview of an example trading system configuration, in accordance with the preferred embodiments, used to relay market information to a variety of trading terminals.

FIG. 1 is a block diagram that illustrates an example electronic trading system 100. The electronic trading system 100 includes one or more electronic exchanges 102, 104, 106 and one or more client devices 108, 110, 112. Intermediate devices such as gateways 114, 116, 118, routers (not shown), and other such types of network devices may be used to connect network 120 to networks 122, 124, 126 so that client devices 108, 110, 112 and exchanges 102, 104, 106 can communicate.

As indicated above, the preferred embodiments are not limited to any particular trading system configuration. For instance, networks 122, 124, 126 could represent the same network, network 120 could represent the same network as networks 122, 124, 126, or client devices 108, 110, 112 could connect directly to gateways 114, 116, 118. In addition, it is understood that the preferred embodiments may be implemented with systems that have only one electronic exchange (e.g., one of electronic exchanges 102, 104, 106) that lists one or more tradeable objects.

A. Electronic Exchange

In one embodiment, electronic exchanges 102, 104, 106 represent electronic trading platforms that preferably support electronic transactions of various kinds of tradeable objects. Examples of more sophisticated electronic trading platforms include the London International Financial Futures and Options Exchange (LIFFE), the Chicago Board of Trade (CBOT), the Chicago Mercantile Exchange (CME), the Exchange Electronic Trading ("Xetra," a German stock exchange), and the European Exchange ("Eurex").

In another embodiment, electronic exchanges 102, 104, 106 might refer to other facilities, which include more basic systems that automatically match incoming orders. According to this embodiment, for instance, an electronic exchange 102, 104, 106 might simply refer to an online trading place where sports fans go to buy or sell seats for an event.

Each of the electronic exchanges 102, 104, 106 may host one or more computer-based electronic markets. An electronic market can implement any of the numerous types of order execution algorithms; sometimes the type of algorithm depends on the tradeable object being traded. By way of illustration only, some example order execution algorithms include price/time priority (also referred to as first-in-first-out or "FIFO") and pro rata-style algorithms. The FIFO algorithm, for instance, attempts to give priority to the first person to place an order. The pro rata algorithm, for instance, splits all (or most) orders for the same price at a particular point in time. The system and method of the present invention are not limited to any particular type of order execution algorithm.

It is further understood that an electronic market might include other software and/or hardware components to perform other tasks beyond matching orders or part of orders. These software and/or hardware components may be local or remote to the physical location of an electronic exchange. In other words, the components can be operated at the electronic exchange or at locations outside of the electronic exchange such as points of access. Points of access may include gateways or other fast computing devices that are nearby the electronic exchange and have access to other points of access near other electronic exchanges.

B. Gateway

In one embodiment, gateways 114, 116, 118 function as portals to a particular electronic exchange. Gateways 114, 116, 118 may include any computing device such as a mainframe, super minicomputer, minicomputer, workstation, or personal computer that connect network 120 to networks 122, 124, 126 so that market information may be successfully passed between client devices 108, 110, 112 and exchanges 102, 104, 106.

According to one aspect, gateways 114, 116, 118 preferably receive market data from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A user at one of client devices 108, 110, 112 can preferably subscribe to price information, order information, and fill information for a particular electronic market hosted at exchanges 102, 104, 106. According to another aspect, gateways 114, 116, 118 preferably receive transaction information, such as orders, order changes, queries, etc. from client devices 108, 110, 112 and forward that information to corresponding exchanges 102, 104, 106.

In another embodiment, client devices 108, 110, 112 might connect to electronic exchanges 102, 104, 106 without the need for protocol translation. For instance, a client device might have computer software that recognizes a particular exchange's protocol, and therefore, may have a direct connection to the electronic exchange.

It is further understood that gateways or similar types of computer-based devices may be used as points of access. Accordingly, client devices 108, 110, 112 may access an electronic exchange through a gateway, especially if the gateway(s) is used as a point of access in a network and/or at an electronic exchange.

C. Client Device

In one embodiment, client devices 108, 110, 112 function as an interface to trade at one or more electronic exchanges 102, 104, 106. Examples of client devices include a personal computer, laptop computer, hand-held computer, and so forth. Client devices 108, 110, 112, according to one aspect of the preferred embodiments, include at least a display, processor and memory. The processor and memory, which are both well-known computer components, are not shown in the Figure for sake of clarity.

It is understood that a display includes any visual output device of a client device. For sake of illustration only, examples include a CRT-based display, LCD-based display, a gas plasma-based display, or any other type of display device. For instance, the display device might be physically set on a desk top for a user to view, projected on a wall by a projector, or head mounted in special goggles.

It is further understood that a processor includes any device that, among other things, interprets and executes instructions. In other words, the processor functions as the "brains" of the computer device. Processor may also encompass any components that make up the computers main console to perform the functions described herein.

It is further understood that memory includes a device where information can be stored (temporarily or otherwise) on any computer readable medium and retrieved. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In one embodiment, depending on what tradeable objects are being traded, each of client devices 108, 110, 112 receive market information from one or more electronic markets hosted at any of electronic exchanges 102, 104, 106. Accordingly, market information is displayed to the user(s) in a trading screen, in accordance with the preferred embodiments, on a visual output device or display device. A user may also receive news to aid him in analyzing information received from the exchange.

Upon viewing the market information or a portion thereof, a user may wish to send orders to an exchange, cancel orders in a market, change orders in a market, query an exchange, and so on. To do so, the user may input various commands or signals into the client device 104, for example, by using one or more conventional means for inputting information such as typing into a keyboard, inputting commands through a mouse, or inputting commands or signals through some other input device.

Upon receiving one or more commands or signals, client devices 108, 110, 112 preferably generate transaction information. In addition to or in place of manual entry, a user might use automated trading software that automatically or semi-automatically generates transaction information. Of course, there are many different types of messages and/or order types that can be submitted to an electronic exchange, all of which may be considered various types of transaction information.

Once generated, for instance, transaction information is sent from client device 108 to exchange 102 over network(s) 120 and 122.

III. System Function and Operation

As will be appreciated by one of ordinary skill in the art, various aspects of the preferred embodiments may be operated in an entirely software embodiment, in an entirely hardware embodiment, or in a combination thereof. In the interest of clarity, the preferred embodiments are described in a software embodiment based on a C or C++ language, or any other suitable programming language, which is executed on a computer device. As such, the preferred embodiments take the form of a computer program product that is stored on a computer readable medium and is executed by a suitable instruction execution system or processor in the computer device. Examples of computer readable medium were provided above.

It is understood that the description contained herein is considered as illustrative only of the various aspects of the preferred embodiments. Further, since numerous modifications and changes will readily occur to those skilled in the art, it is not desired to limit the present invention to the construction and operation shown and described, and accordingly, all suitable modifications and equivalents may be resorted to.

Figure 2:
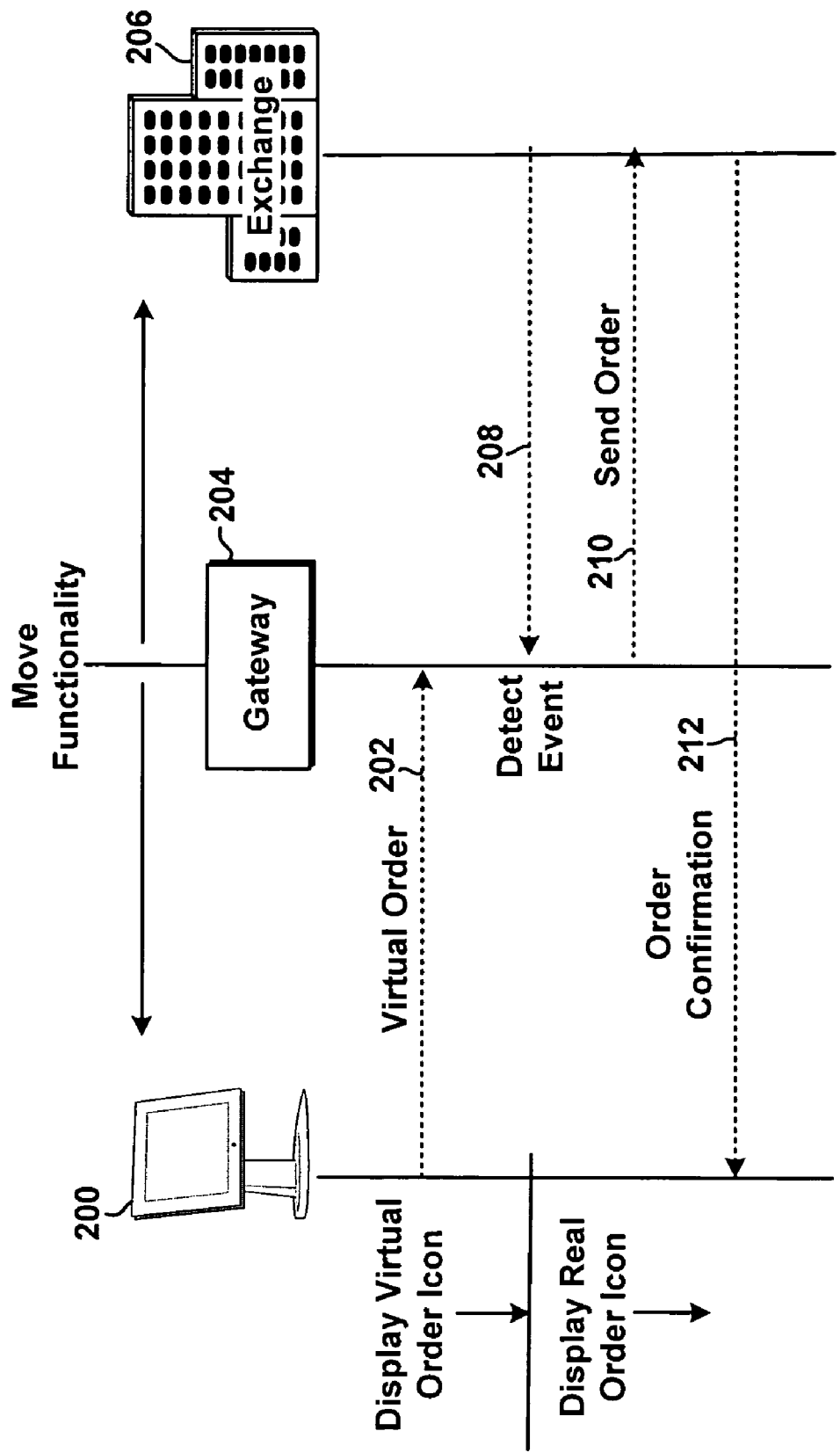
FIG. 2 illustrates an example message flow diagram used to illustrate aspects of the preferred embodiments.

FIG. 2 shows a message flow diagram for illustrating an example method of operation, and more specifically shows the functionality and operation of a possible implementation of the preferred embodiments. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention.

Referring to FIG. 2, a user enters a virtual order to buy or sell a particular tradeable object through an order entry interface of client device 200. The virtual order preferably includes the necessary order parameters to successfully buy or sell the tradeable object and complete a transaction, if needed to do so. Examples of order parameters that are common among tradeable objects include price and quantity, however, these examples are not meant to be exhaustive. One skilled in the art will recognize the various order parameters required to place an order to buy or sell a particular tradeable object at the exchange. At line 202, the virtual order is preferably sent from the client device 200 to a gateway 204 over a network where it is temporarily held until it is either released to the matching engine at electronic exchange 206 or it is deleted.

At gateway 204, the preferred system constantly monitors the market conditions for rapid changes in available quantities. As indicated earlier with respect to FIG. 1, the gateway 204 receives market data from the electronic exchange 206 and then relays this information to the client device 200. In doing so, the gateway 204 has access to the market data before the client device 200 and can monitor changes in the market conditions sooner than a client device 200. Once the market begins to move, the preferred system, per programmed instructions, can detect a rapid change in trades occurring at a particular price. It might do this, for instance, by estimating the demand for the tradeable object at the particular price by calculating the rate of trades. The preferred system may calculate the rate of trades by looking to the most recent last traded message or messages sent from the electronic exchange 206 to gateway 204 represented by line 208. For instance, the preferred system might estimate the quantity that has been matched at a price in the last period, or the preferred system might estimate the percentage of the total quantity at a price that has been matched in the last period. Then, if the rate of trades goes above a preset value, the event is detected at the gateway 204.

In response to detecting an event at gateway 204, the preferred system checks to see if a virtual order is being held at the price of movement (or prices of movement if more than one price level is being monitored by the system). If so, then the preferred system quickly releases the order (or orders) to the matching engine at electronic exchange 206 at line 210. The electronic exchange 206 can confirm that the order has been received through an order confirmation sent to client device 200 at line 212. The gateway 204 may also receive the order confirmation.

According to one feature of the preferred embodiments, if the order misses out on an opportunity, the preferred system can be programmed to automatically delete the order from the exchange's order book. For instance, it might do this if the order remains at the exchange for too long without being partially or fully filled.

According to another feature of the preferred embodiments, a virtual order is graphically represented on a screen in the form of an icon. An icon is preferably a small image displayed on the screen to represent a virtual order and can preferably be manipulated by the user. Preferably, the icon indicates whether the virtual order is to buy or sell the tradeable object, how much of the tradeable object to buy or sell (order quantity), and may even indicate the type of event associated with the virtual order. Depending on the format of the screen, a virtual order icon may be displayed in association with a price or a derivative of price value. Example virtual order icons are shown in FIGS. 3-6.

According to another feature of the preferred embodiments, a real order is also graphically represented on the screen in the form of an icon. Preferably, the real order icon and the virtual order icon are visually distinguishable so that a user would recognize the type of order.

According to another feature of the preferred embodiments, a virtual order may be deleted before an event occurs. Once the order request becomes an order and reaches the matching engine, the virtual order icon is automatically transformed into a real order icon, which may also be deleted but at the risk of being filled or partially filled by the matching engine. A user may delete a virtual order simply by clicking on the virtual order icon with a single action of a user input device or by dragging the order icon off the trading screen. As used herein, a single-action preferably refers to a single click of a mouse as a means for user input and interaction with the terminal display. While this describes a preferred mode of interaction, the scope of the present invention is not limited to the use of a mouse as the input device or to the click of a mouse button as the user's single-action. Rather, any action by a user within a short period of time, whether comprising one or more clicks of a mouse button or other input device, is considered a single-action of the user for the purposes of the present invention.

According to yet another feature of the preferred embodiments, a virtual order may be managed by a user. For instance, a user can preferably move a virtual order, by dragging the icon, to another price level and dropping it. The order parameters, and in particular the price, of the virtual order are automatically updated to the appropriate price level. Also, a user can preferably change the quantity of the virtual order by adding new order requests to that price level.

In the above example with respect to FIG. 2, the virtual order was temporarily held by the preferred system at the gateway 204 and it was the preferred system at the gateway 204 that detected the actual event. It is understood, however, that different aspects of the preferred system may be implemented at either the client device 200 and/or the electronic exchange 206. In other words, the functionality may be moved closer to or at the client device 200, or closer to or at the electronic exchange 206. One skilled in the art will recognize the advantages of each of the various possibilities.

In one embodiment, the preset value that represents the rate of trades is programmable by the user. As such, a graphical user interface ("GUI") may be used. A GUI is a visual environment that preferably represents options with graphical images, such as icons, menus, and dialog boxes on a screen. The user may select and activate these options by pointing and clicking with a mouse, selecting them with a keyboard, or by setting them with some other input device. The GUI could be included in a separate window from the actual trading screen and/or various aspects of the GUI could be integrated with the trading screen, such as displaying one or more selective buttons or icons on the trading screen. It is also possible to set such parameters through something other than a graphical user interface, such as through command-line entry system.

The input mechanism could be as simple as allowing a user to turn the feature of the preferred embodiments "on" or "off." In addition, the input mechanism could provide a user with a variety of values that represent different rate of trades. The variety of values could be based on historical values that lead to market waves or they could be based on some other source. As such, the user could simply select one of the values. In another aspect, the input mechanism could allow a user to link his or her own formulas to create a dynamic value that represents a changing rate of trades.

In another embodiment, the user can customize any event, not just a rate of trade event described above, so that the virtual order is refrained from being sent until the customized event occurs. A GUI may be used to customize the event. Some examples are provided here, with the understanding that they are not meant to be exhaustive, and include a news event, an occurrence in another market for another tradeable object, an occurrence in the user's own strategy in this market or another market, or any other definable event.

IV. Example

A. Example Order Entry Screen

As indicated earlier, the preferred embodiments may work with any trading screen, however they work particularly well with a trading screen that utilizes an axis or value scale. For a more detailed understanding of a trading screen that uses an axis or price scale, a person of ordinary skill would know to refer to incorporated U.S. patent application Ser. No. 09/590,692, entitled "Click Based Trading With Intuitive Grid Display of Market Depth," U.S. patent application Ser. No. 10/376,417, entitled "A System and Method for Trading and Displaying Market Information in an Electronic Trading Environment," and U.S. patent application Ser. No. 09/971,087, entitled "Click Based Trading with Intuitive Grid Display of Market Depth and Price Consolidation." The entire content of each of the above-referenced applications are incorporated herein by reference.

In addition, the preferred embodiments may be used along with various trading tools to increase a user's efficiency and to reduce the time it takes a user to digest market data and enter virtual and/or real orders. Trading tools associated with a trading screen that utilizes an axis or price scale are described in U.S. patent application Ser. No. 10/125,894, entitled "Trading Tools for Electronic Trading," the contents of which are also incorporated herein by reference.

Figure 3:
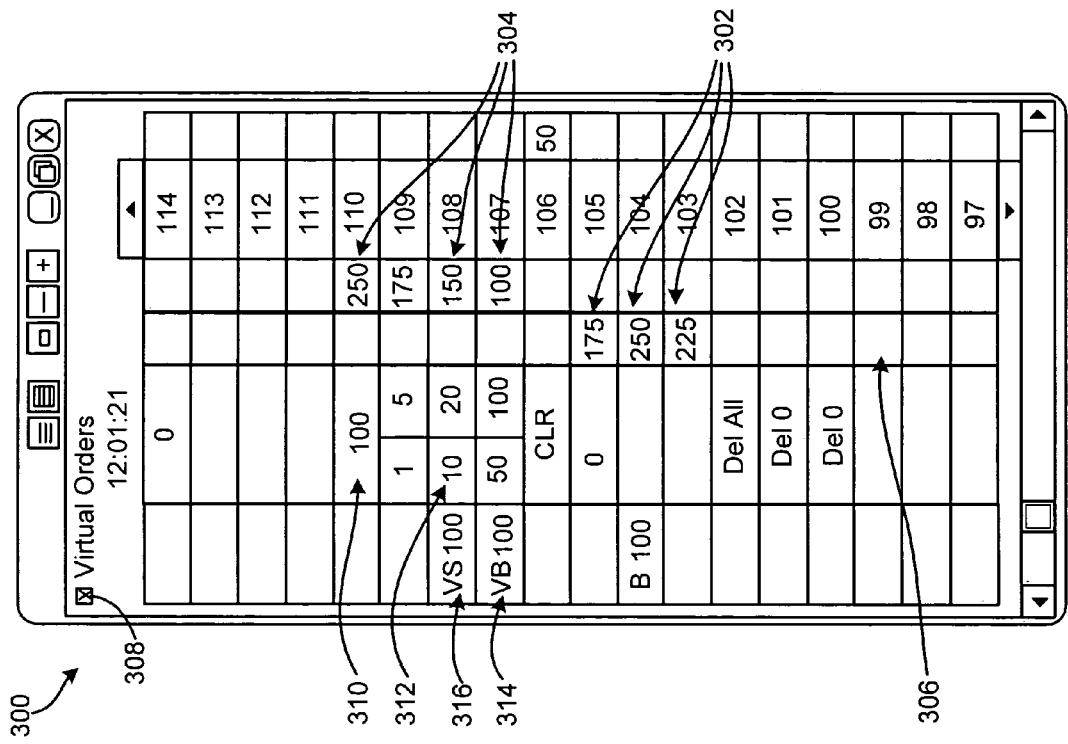
FIGS. 3-5 illustrates an example trading screen used to illustrate an example of the preferred embodiments.

FIG. 3 shows an example display 300 that displays market information in relation to a scale or an axis. As indicated earlier, a client device receives market data sent from an electronic exchange. A display device, such as a computer monitor, displays at least one bid indicator (bid indicators generally shown as 302) and at least one ask indicator (ask indicators generally shown as 304) on the display 300. Each of bid indicators 302 represents quantity associated with at least one order to buy the tradeable object and each of ask indicators 304 represents quantity associated with at least one order to sell the tradeable object. A display control component, such as a graphical interface software component, dynamically updates and displays the bid indicator(s) 302 and the ask indicator(s) 304 at locations in one or more regions 306, each location in a particular region corresponds to a price or value on the axis. Locations can be selected by an input device to send trade orders. Prices or values on the axis can be displayed or not displayed. For sake of illustration, prices are shown on axis in FIG. 3.

Preferably, the axis comprises a scale that is graduated in increments and each increment is associated with a particular price or value. For instance, the values might represent price in units of ticks, where a tick is minimum change in a price value that is set by the exchange for each tradeable object, or in some other unit of measurement. However, values might instead represent net change, yield, volatility, or any other indicator which may be displayed along an axis. The arrangement of values can be in a column format, such as shown in FIG. 3, a row format, or any other desired format. The arrangement of values may also be aligned in a straight manner, such as shown in FIG. 3, or curved, whichever is more desirable.

Irrespective of the actual axis format, market data is dynamically mapped to corresponding values along the axis, such that working orders, bid quantities, ask quantities, and any other indicator can be easily viewed in association with their proper values. For instance, from the screen shown in FIG. 3 it can be easily seen that the current best bid price is "105" with an available quantity of "175." Whereas the current best offer price is "107" with an available quantity of "100." The next best offer price currently in the market is "108" with an available quantity of "150," and so on. Other indicators may also be shown in relation to the series of values on the axis, such as the last traded quantity and working orders. From the screen shown in FIG. 3 it can be seen that the most recent last traded quantity is "50" at a price of "106," a current working order is to buy "100" at a price of "104," and two virtual orders to buy "100" at a price of "107" and to sell "100" at a price of "108" is shown. As market data is updated, indicators 302 and 304 may reflect different quantities and/or move relative to the series of values on the axis.

In some instances, the values on the axis may appear "static" to the user such that the market's movement can be easily tracked as it ascends or descends in value along the axis. If the market moves out of view of the display (or for any other reason), a repositioning command may be received to re-center or reposition the axis and its associated market data so that the market data or portions thereof are put back into view of the display. This may be referred to as displaying market information along a "static axis."

Preferably, a user can enter virtual orders in the same manner as real orders are entered. A trading screen may be programmed to accept signals indicating a desire to send buy or sell orders (virtual orders are temporarily held and real orders are sent to the exchange). For instance, a user may be able to send virtual orders and/or real orders by simply clicking in designated regions, such as in buy and/or sell order entry regions, of the display. Likewise, virtual orders and/or real orders could be easily cancelled with the click of a mouse. As such, the preferred embodiments build on the order entry and order cancellation concepts described in the incorporated U.S. patent application Ser. No. 09/590,692, entitled, "Click Based Trading With Intuitive Grid Display of Market Depth."

Figure 6:
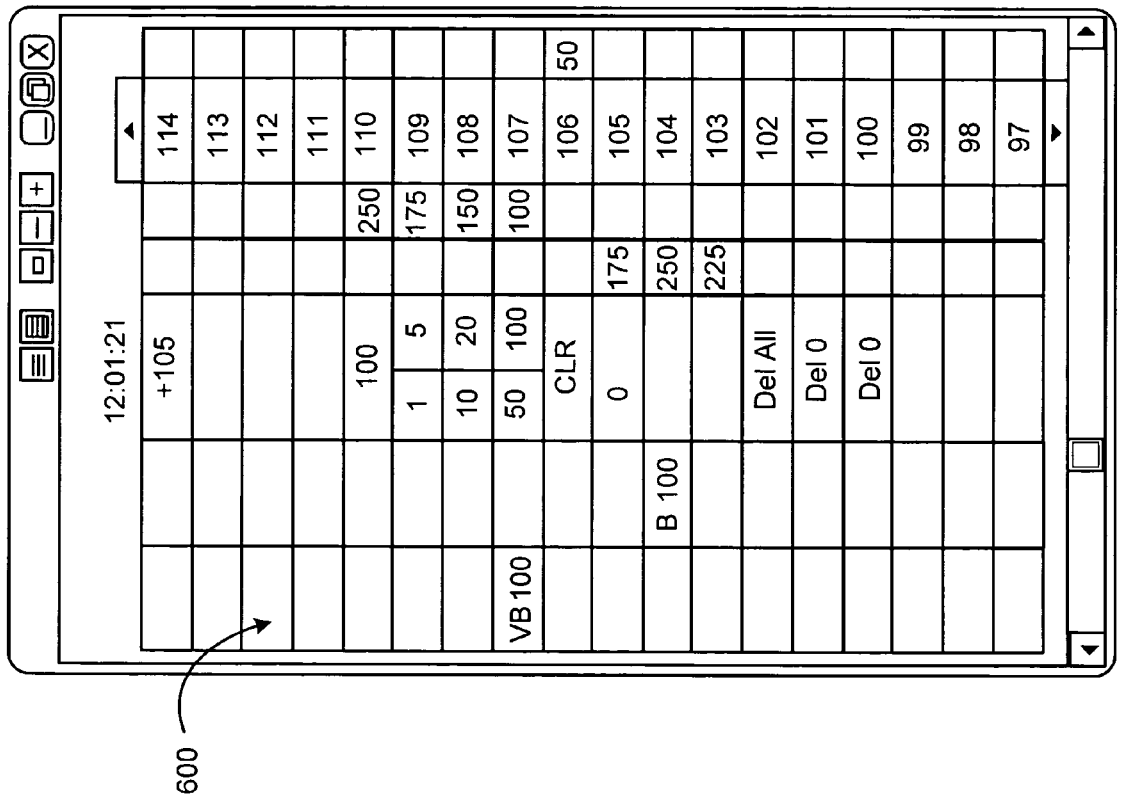
FIG. 6 illustrates another embodiment for displaying virtual order icons in a manner that can be easily distinguishable from real order icons.

According to one aspect of the preferred embodiments, to enable a user to quickly send a virtual order, one or more parameters of the virtual order are preferably based on at least one preset parameter and the location of a cursor on the display. According to one preferred embodiment, a virtual order's quantity is based on a preset quantity (shown at 310 in FIG. 3 and set by number icons 312) while the order's price is based on the location of the cursor on the display 300. Of course, the preset parameter can be based on something other than quantity such as last traded quantity ("LTQ"), a theoretical value, price, or some other item of interest. Additionally, the preset parameter may be linked to and/or based on a dynamic value or an equation. The virtual order parameters may be set using the same methods used to set a real order's parameters. However, in order for the software to distinguish a virtual order command from a real order command, a check box 308 may be selected to activate virtual orders and unselected to deactivate virtual orders. Once the check box 308 is selected, "order commands" are interpreted as virtual orders. Other methods of distinction may be used such as have a separate column for virtual orders (such as shown in FIG. 6), selecting a different mouse button, or through any other programmed mechanism.

According to one aspect of the preferred embodiments, the display has one or more regions 306. The regions can be set up so that one region is an order entry region for buy orders and another region is an order entry region for sell orders. A buy order entry region can be an area dedicated for order entry, or alternatively, the buy order entry region can overlap other regions such as the bid quantity display region. The same may be true for a sell order entry region. Then, when an input device used to control the cursor is positioned over one of the order entry regions, and a button is "pressed" an order to buy (if the cursor is positioned over the buy order entry region) or an order to sell (if the cursor is positioned over the sell order entry region) would be sent to the electronic exchange.

It is understood that the preferred embodiments may have multiple buy regions and/or multiple sell regions. As indicated earlier, for example, each of the multiple buy regions and each of the multiple sell regions could represent a different order type such as virtual orders and real orders (not shown in FIG. 3). Other example order types known to one skilled in the art of trading include basket, iceberg, block orders limit, limit-on-close, limit-on-open, market, market-on-close, market-on-open, odd lot, one-cancels-all, relative stop, stop limit, sweep-to-fill, and volume weighted average price.

According to one aspect of the preferred embodiments, virtual orders can be initiated by simply clicking in buy and/or sell order entry regions of the display. In other words, virtual orders may be sent by a single-action of a user input device. As used herein, a single-action preferably refers to a single click of a mouse as a means for user input and interaction with the terminal display. While this describes a preferred mode of interaction, the scope of the present invention is not limited to the use of a mouse as the input device or to the click of a mouse button as the user's single-action. Rather, any action by a user within a short period of time, whether comprising one or more clicks of a mouse button or other input device, is considered a single-action of the user for the purposes of the present invention.

For example, referring to FIG. 3, a buy order entry region might include cells on the bid side and a sell order entry region might include cells on the ask side. Then, with a preset quantity already set and box 308 checked, if one clicks on a cell in the buy order entry region, then a virtual order would be initiated to buy a quantity of the tradeable object equal to the preset quantity at the price associated with the cell. If one clicks on a cell in the sell order entry region, then a virtual order would be initiated to sell a quantity of the tradeable object equal to the preset quantity at the price associated with the cell.

In another aspect of the preferred embodiments, buttons on an input device are programmed so that when a particular button is pressed it sends a buy virtual order and that when another button when pressed it sends a sell virtual order. For instance, with a present quantity already set, if one clicks on a cell associated with a price with the right mouse button, then a virtual order would be initiated to sell a quantity of the tradeable object equal to the preset quantity at the price associated with the cell. If one clicks on a cell associated with a price with the left mouse button, then a virtual order would be initiated to buy a quantity of the tradeable object equal to the preset quantity at the price associated with the cell.

B. Entering a Virtual Order

As shown in FIG. 3, two virtual orders have been entered. Namely, one to buy "100" at a price of "107" and one to sell "100" at a price of "108." The virtual orders are preferably displayed, shown as icons 314 and 316, respectively, to the user at the user terminal, even though the exchange order book has not yet recorded the orders. As indicated earlier, the actual display of the virtual order icons may differ from those shown in the figure. Note too that the time at the top of the trading screen indicates "12:01:21."

Figure 4:
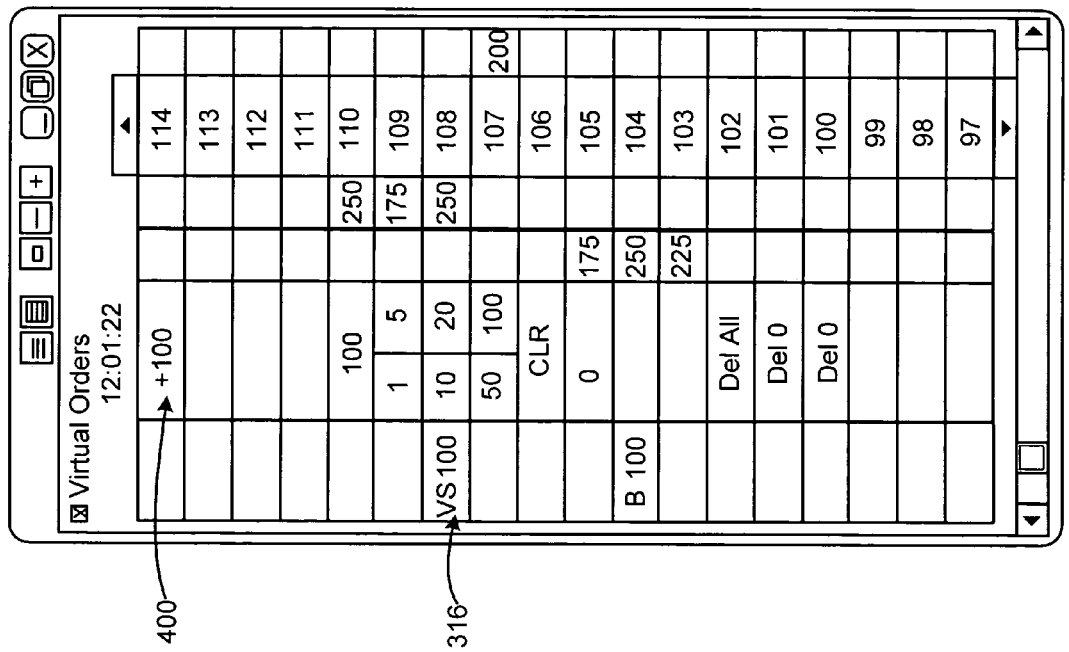

FIG. 4 shows the same trading screen as FIG. 3, only some time in the near future (e.g., the trading screen in FIG. 4 indicates one second later for purposes of this illustration). The last traded quantity is now "200" at a price of "107." Basically, the market quickly moved up in value and a quantity of "200" has been traded by the matching engine, including the virtual order to buy "100." That is, the preferred system detected a move in the market at the price of "107," and released the virtual buy order at "107" to the matching engine. Preferably, the move was detected by measuring the rate of trades at "107." Notice also that the user's net position, shown at 400 in FIG. 4, is now "+100" indicating that his order has been matched and that he is now long "100."

As shown by icon 316 in FIG. 4, the sell virtual order is still being held, as a change in quantity has not yet occurred at price "108," and even if a change has occurred, the change preferably has to be large enough to trigger a particular event.

Alternatively, in response to releasing the virtual buy order at "107," the system may also release the virtual sell order at "108" in hopes to capture a market opportunity. In particular, if detecting the upward movement at "107," the system may also release the virtual sell order at "108." This alternative embodiment is not shown in the figures, however, this alternative example demonstrates to the reader the ability to flexibly customize how virtual orders can be released.

Figure 5:
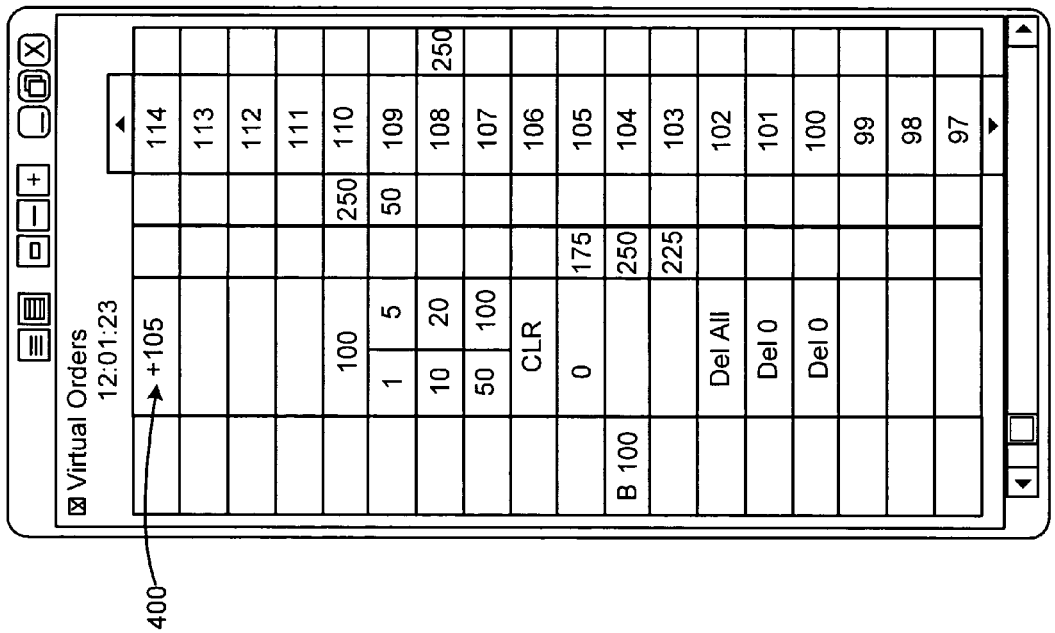

FIG. 5 shows the same trading screen as FIGS. 3 and 4, only some time in the near future of FIG. 4 (e.g., the trading screen in FIG. 5 indicates one second later than FIG. 4 for purposes of this illustration). The last traded quantity is now "250" at a price of "108." Again, the market quickly moved up in value and a quantity of "250" has been filled by the matching engine, including the virtual order to sell "100" at "108." That is, the preferred system detected another move in the market at the price of "108," and released the virtual sell order at "108" to the matching engine. Preferably, the move was detected by measuring the rate of trades at "108." Notice also that the user's net position is now "0" indicating that he is flat. As a result of the last two trades, the user has made a profit by buying "100" at "107" and selling "100" at "108."

FIG. 6 shows another example embodiment. In particular, the order entry region includes a separate region (or column in this example) for displaying virtual order icons. That way, a user can simply select a location in the separate region for virtual orders to initiate order requests.

It is understood that if the virtual order gets released, the virtual order icon will preferably be transformed or removed and a real order icon is displayed to indicate that the order has now been sent to the matching engine. For instance, if the same region displays both virtual order icons and real order icons, then the virtual order icon may transform into a real order icon. If there is a region that displays virtual order icons and another region that displays real order icons, then the virtual order icon is preferably removed and the real order icon is displayed. As such, a user would easily recognize that the virtual order has been released and is now being sent to or is at the matching engine.

V. Conclusion

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

It is further understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It is further understood that a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method for sending an order to an electronic exchange, the method comprising:

receiving, via a computer device, a command representing an order request that comprises an order to buy or sell a quantity of a tradeable object at a particular price;

temporarily holding the order request in a memory unit such that the order request is not sent to a matching engine at the electronic exchange until a preset rate of trades occurring at one or more prices to buy or sell the tradeable object is detected, wherein the preset rate of trades is based on an order quantity traded at the one or more prices;

receiving, via a computing device, market data comprising quantity and price information relating to the tradeable object being traded at the electronic exchange;

using the market data to determine, via a computing device a rate of trades occurring at one or more prices to buy or sell the tradeable object at the electronic exchange;

comparing, via a computing device, the rate of trades to a preset rate of trades; and automatically releasing the order request to the matching engine at the electronic exchange upon detecting the preset rate of trades.

2. The method of claim 1 further comprising displaying an order entry region comprising a plurality of locations for receiving the command to send the order request, each location corresponding to a price level along a common static price axis.

3. The method of claim 2 further comprising in response to a selection of a particular location of the order entry region by a single action of a user input device, setting a plurality of parameters for the order request relating to the tradeable object and sending the order request to a gateway.

4. The method of claim 2 further comprising displaying a second plurality of locations in the order entry region for receiving the command to send an order to an electronic exchange, each location corresponding to a price level along the common static price axis.

5. The method of claim 2 wherein the order entry region is displayed on a screen of a user terminal.

6. The method of claim 1 further comprising:
dynamically displaying a first indicator in one of a plurality of locations in a bid display region, each location in the bid display region corresponding to a price level along a common static price axis, the first indicator representing quantity associated with at least one order to buy the tradeable object at the highest bid price currently available in the market; and
dynamically displaying a second indicator in one of a plurality of locations in an ask display region, each location in the ask display region corresponding to a price level along the common static price axis, the second indicator representing quantity associated with at least one order to sell the tradeable object at the lowest ask price currently available in the market.

7. The method of claim 1 further comprising displaying a first type of order indicator representing the order request at a first time, wherein the first time represents a time before the preset rate of trades is detected.

8. The method of claim 7 further comprising displaying a second type of order indicator representing the order request at a second time, wherein the second time represents a time after the preset rate of trades is detected, and wherein the first type of order indicator is no longer displayed.

9. The method of claim 7 further comprising modifying the first type of order indicator into a second type of order indicator representing the order request at a second time, wherein the second time represents a time after the preset rate of trades is detected.

10. The method of claim 7 further comprising displaying a second type of order indicator representing a real order, wherein the first type of order indicator is visually distinguishable from the second type of order indicator.

11. The method of claim 7 wherein the first type of order indicator indicates a quantity of the order request and if the order request is a buy or sell order request.

12. The method of claim 7 wherein the first type of order indicator indicates the preset rate of trades.

13. The method of claim 1 further comprising:
receiving the order request at an intermediary device in communication with a user terminal at which the order request was initiated and further in communication with the electronic exchange, wherein the intermediary device automatically releases the order request to the matching engine at the electronic exchange upon detecting the preset rate of trades.

14. The method of claim 1 further comprising:
receiving the order request at a computer device at the electronic exchange, the computer device in communication with a user terminal at which the order request was initiated, wherein the computer device automatically releases the order request to the matching engine at the electronic exchange upon detecting the preset rate of trades.

15. The method of claim 1 further comprising:
receiving the order request at a computer device that is remote to the electronic exchange and that is in communication with the electronic exchange, wherein the computer device automatically releases the order request to the matching engine at the electronic exchange upon detecting the preset rate of trades.

16. A method for sending an order to an electronic exchange, the method comprising:
receiving, via a computer device, a command representing an order request that comprises an order to buy or sell a quantity of a tradeable object at a particular price;
refraining from sending the order request to a matching engine at the electronic exchange until a preset rate of trades occurring at one or more prices to buy or sell the tradeable object is detected, wherein the preset rate of trades is based on an order quantity traded at the one or more prices;
receiving, via a computing device, market data comprising quantity and price information relating to the tradeable object being traded at the electronic exchange;
using the market data to determine, via a computing device a rate of trades occurring at one or more prices to buy or sell the tradeable object at the electronic exchange;
comparing, via a computing device, the rate of trades to a preset rate of trades; and
automatically forwarding the order request to the matching engine at the electronic exchange upon detecting the preset rate of trades.

17. The method of claim 16 further comprising displaying a first type of order indicator representing the order request at a first time, wherein the first time represents a time before the preset rate of trades is detected.

18. The method of claim 17 further comprising displaying a second type of order indicator representing the order request at a second time, wherein the second time represents the time after the preset rate of trades is detected.

19. The method of claim 16 further comprising displaying a first type of order indicator that represents a virtual order and a second type of order indicator that represents a real order, wherein the first type of order indicator is visually distinguishable from the second type of order indicator.

20. The method of claim 16 further comprising deleting the order request from an exchange order book at the matching engine.

21. A computer readable medium having stored therein instructions to execute a method for sending an order to an electronic exchange, the method comprising:

receiving a command representing an order request to buy or sell a quantity of a tradeable object at a particular price;

refraining from sending the order request to a matching engine at the electronic exchange until a preset rate of trades occurring at one or more prices to buy or sell the tradeable object is detected based on market data, wherein the preset rate of trades is based on an order quantity traded at the one or more prices;

receiving market data comprising quantity and price information relating to the tradeable object being traded at the electronic exchange;

using the market data to determine a rate of trades at the one or more prices for the tradeable object at the electronic exchange;

comparing the rate of trades to the preset rate of trades; and automatically forwarding the order request to the matching engine at the electronic exchange upon detecting the preset rate of trades.

22. A method for sending an order to an electronic exchange, the method comprising:

receiving, via a computer device, a command representing an order request that comprises an order to buy or sell a quantity of a tradeable object at a particular price;

displaying at a user terminal a first type of indicator representing the order request;

refraining from sending the order request to a matching engine at the electronic exchange until a preset rate of trades occurring at one or more prices to buy or sell the tradeable object is detected, wherein the preset rate of trades is based on an order quantity traded at the one or more prices;

receiving, via a computing device, market data comprising quantity and price information relating to the tradeable object being traded at the electronic exchange;

using the market data to determine, via a computing device a rate of trades occurring at one or more prices to buy or sell the tradeable object at the electronic exchange;

comparing, via a computing device, the rate of trades to a preset rate of trades; and forwarding the order request to the matching engine at the electronic exchange upon detecting the preset rate of trades; and displaying at a user terminal a second type of indicator representing the order request, wherein the first type of indicator represents the order request at a first time which represents a time before the preset rate of trades is detected and the second type of indicator represents the order request at a second time which represents a time after the preset rate of trades is detected.

* * * * *

UNITED STATES PATENT AND TRADEMARK OFFICE
CERTIFICATE OF CORRECTION

PATENT NO.       : 7,647,266 B1                                     Page 1 of 1
APPLICATION NO. : 10/807762
DATED            : January 12, 2010
INVENTOR(S)      : Mark W. Triplett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Sixteenth Day of November, 2010

David J. Kappos
*Director of the United States Patent and Trademark Office*